J. CARTON.

Locomotive Head Light.

No. 2,680.

Reissued July 16, 1867.

Witnesses
Benj. F. French
Thomas M. Neal

Inventor
John Carton

N. PETERS. Photo-Lithographer, Washington, D. C.

UNITED STATES PATENT OFFICE.

JOHN CARTON, OF UTICA, NEW YORK, ASSIGNEE OF JOHN STUBER.

IMPROVEMENT IN LOCOMOTIVE HEAD-LIGHTS.

Specification forming part of Letters Patent No. 14,942, dated May 20, 1856; Reissue No. 2,680, dated July 16, 1867.

*To all whom it may concern:*

Be it known that JOHN STUBER, of Utica, New York, did invent a new and useful Improvement in Railroad-Lamps used for Head-Lights; and I hereby declare that the following is a full and exact description thereof, reference being had to the accompanying drawings, making part of this specification, in which—

Figure 1:
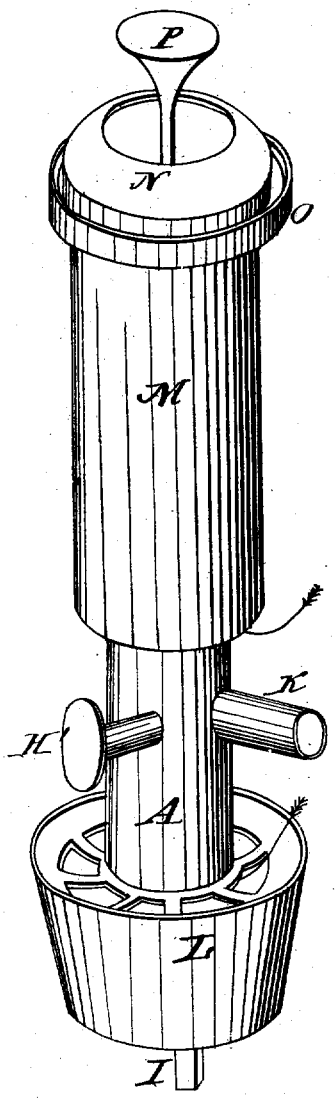
Figure 2:
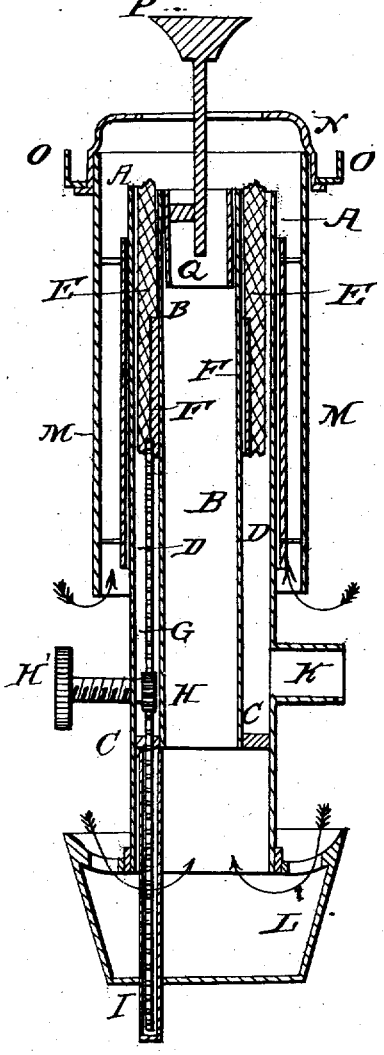

Figure 1 is a perspective view of the burner and connected parts, and Fig. 2 is a sectional view of the same.

The burner is like an ordinary Argand burner, (with the additions, arrangements, and combinations hereinafter mentioned,) and is formed of an outer tube or barrel, A, and an inner smaller one, B, united together at the bottom C, thus forming a cylindrical space, D, between them, for holding the wick E, the wick-thimble F, and the rack G, for raising and lowering the wick, and H the pinion for operating the same by means of the milled head H′. The lower end of the rack which passes through C is inclosed in a small tube, I, which is closed at the bottom, to prevent the oil from passing out.

K is the feed-pipe for passing the oil from the oil-reservoir to the burner.

L is a drip-cup attached to the bottom of the outer barrel of the burner.

M is a case or cylinder, outside of and surrounding the burner, on which the cap or deflector N rests.

O is a support or gallery for the chimney.

P is a button, and Q a thimble for supporting the button-rod.

The air for supplying the flame with oxygen on the inside enters the openings in the drip-cup, and passes up the center of the burner, when it is deflected against the flame by the button P. The red arrows indicate the course of the air in this case. The air for supplying the flame with oxygen on the outside passes up through the space between the outer barrel of the burner and the outer case or cylinder, M, and is deflected by the cap or deflector upon the outside of the flame. The black arrows indicate the course of the air in such case.

The distinguishing feature of said invention is adding to the Argand burner all the improvements upon it which experience has shown to be useful in the manner best calculated to produce the most perfect light. The outer cylinder, M, is a most important addition to locomotive head-lights, in combination with the chimney forming a continuation of it, as by reason thereof the flame is protected from all sudden gusts of wind and cross-currents, while it causes a regular and uniform supply of air to ascend to the outside of the flame, as well as aid in heating the air as it passes to the flame; but the addition of the outer cylinder is of less value when no button is used, and both are so where there is no deflector and the chimney is not in connection with the outer cylinder or cap. In locomotive head-lights in use prior to said invention neither button, deflector, nor outer cylinder was used, and the chimney stood at a certain height above the top of the wick. The consequence was the flame was unsteady, and, being driven back by the head-winds, did not fill the reflector properly, and its light was uncertain. By adding and combining the outer cylinder, M, the deflector N, and the button P, with the chimney resting in the chimney-gallery in contact with the outer cylinder, M, the flame is rendered steady and uniform, more perfect combustion is attained, and a purer and whiter light produced, and the flame, of enlarged and uniform figure, more completely fills the reflector.

What I claim as the invention of said JOHN STUBER is—

1. In a lamp having a cylindrical wick, the outer cylinder, M, in combination with the button P.

2. In a lamp having a cylindrical wick, the outer cylinder, M, and button P, in combination with the cap or deflector N.

3. In a lamp having a cylindrical wick, the outer cylinder, M, and deflector N, in combination with the chimney-gallery O.

JOHN CARTON.

Witnesses:
BENJ. F. FRENCH,
MORRIS M. NEAL.